May 25, 1926.

F. L. MÄDLER

VALVE COOLING DEVICE

Filed April 6, 1921

Witnesses:

Inventor:

UNITED STATES PATENT OFFICE.

FRANZ LOUIS MÄDLER, OF BERLIN, GERMANY, ASSIGNOR TO MAEDLER ENGINE CORPORATION, OF CLEVELAND, OHIO, A CORPORATION OF MARYLAND.

VALVE-COOLING DEVICE.

Application filed April 6, 1921, Serial No. 459,195, and in Germany October 3, 1917.

My invention relates to mechanical means for supporting flexible tubes used to supply a liquid cooling medium to valves of internal combustion engines. The particular object of my invention is to prevent any type or kind of flexible tube used in this connection from swinging to and fro, or oscillating in any manner except in one particular plane. The vibrations of the engines and valves quickly destroy any type of flexible tubes, whether wire-wrapped or otherwise reinforced, because the vibrations cause the tubes to oscillate in all directions. This is particularly true in high-speed engines, where the vibrations are at their worst, and the rapid oscillations of the tubes cause the same to break within a very short time.

In order to prevent the tubes from swinging, I insert each tube between two leaf springs made from sheet spring metal, which are attached at one end to the valve and at the other end to a stationary water supply. These springs permit the hose or tube to oscillate in the plane of movement of the valve, and yet positively prevent side swinging or injurious vibrations of the tube.

In the drawings affixed to this specification and forming part thereof a valve cooling arrangement embodying my invention is illustrated by way of example. In the drawings—

Fig. 1 is a side elevation, partly in section, of the valve and the water supply, while

Figure 1:
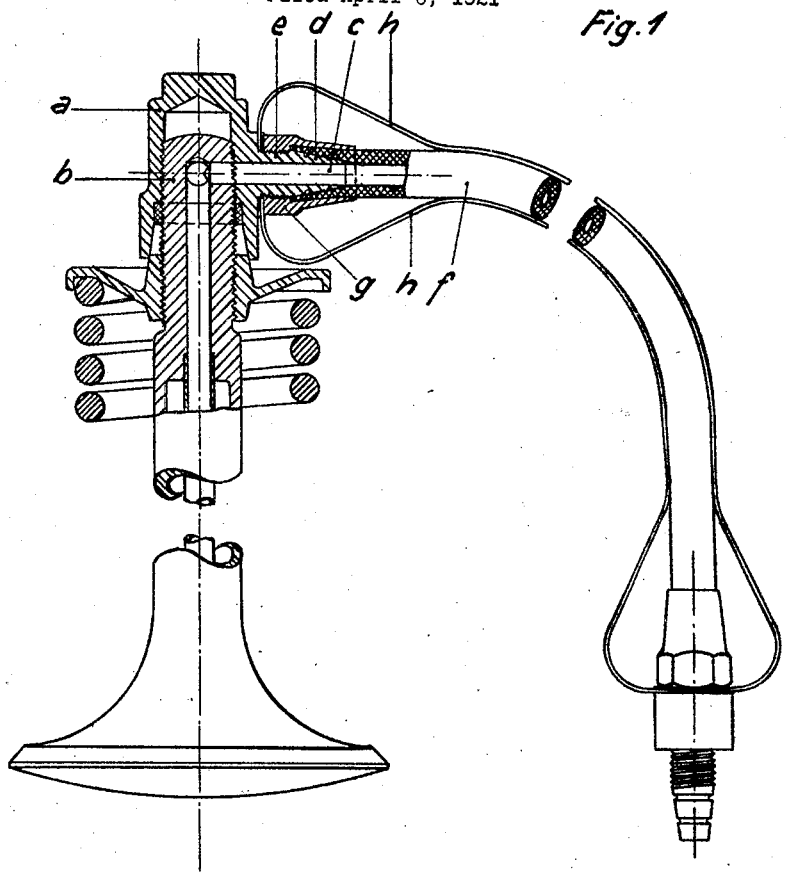
Figure 2:
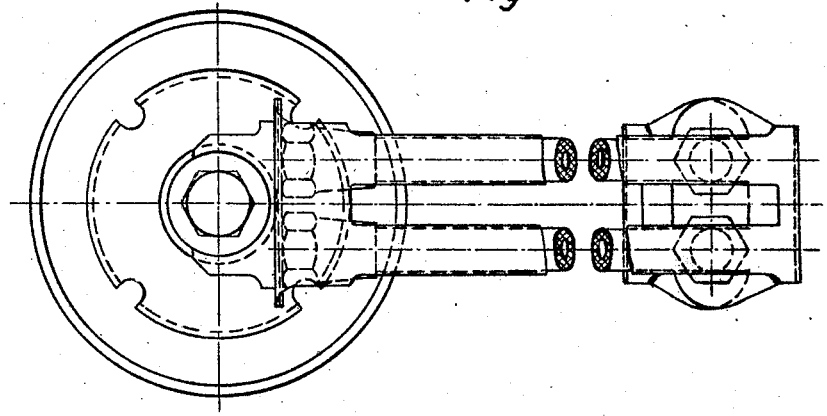
Fig. 2 is a plan.

Referring to the drawings $a$ is a junction-piece fixed to the valve-stem $b$ and carrying two nipples $d$ with borings $c$ for the water to be supplied to and escaping from the interior of the valve. The ends of india rubber tubes $f$, $f$ are fixed on said nipples by aid of screw caps $g$. Two leaf springs $h$, $h$ being fastened to the said nipples and to the stationary water supply, respectively, enclose each rubber tube between them and effectively prevent it from swinging to and fro.

It will be noted that the flat spring members $h$ engage the tubular member $f$ substantially in a plane containing the longitudinal axis of the movable valve. Moreover, while the spring members are in contact with the tubular member along the major portion of its length, they are out of contact therewith adjacent to points of attachment of said tubular member. The tubular member is free to swing in the direction of movement of the valve but is held against sidewise movement.

I claim:

1. In an internal combustion engine, the combination of a vibratory member, a relatively fixed member, a flexible tube connected at its ends to said members, and a pair of leaf springs attached to said members and frictionally engaging said tube on opposite sides along the greater portion of its length, whereby said tube is free to move in the plane of movement of said vibratory member but is effectively prevented from oscillating in any other plane.

2. In an internal combustion engine, the combination of a vibratory member, a relatively fixed member, a flexible tube connected at its ends to said members, and spring means attached to said members and holding said tube against vibration in any plane except the plane of movement of said vibratory member.

3. In an internal combustion engine, the combination of a vibratory member, a relatively fixed member, a flexible tube connected at its ends to said members, and a leaf spring attached to said members and engaging said tube to hold the same against any oscillations except those in the plane of movement of the vibratory member.

In testimony whereof I affix my signature.

FRANZ LOUIS MÄDLER.